(12) United States Patent
Kikugawa (10) Patent No.: US 7,111,042 B2
(45) Date of Patent: Sep. 19, 2006

(54) ELECTRONIC BULLETIN BOARD SYSTEM AND MAIL SERVER

(75) Inventor: Satoru Kikugawa, Tokyo (JP)

(73) Assignee: Gala Incorporated, Tokyo (JP)

( * ) Notice: Subject to any disclaimer, the term of this patent is extended or adjusted under 35 U.S.C. 154(b) by 753 days.

(21) Appl. No.: 09/756,805

(22) Filed: Jan. 9, 2001

(65) Prior Publication Data

US 2001/0018704 A1    Aug. 30, 2001

(30) Foreign Application Priority Data

Feb. 25, 2000    (JP) .............................. 2000-048645

(51) Int. Cl.
    *G06F 15/16*    (2006.01)
(52) U.S. Cl. ...................................... 709/204; 709/205
(58) Field of Classification Search ................ 709/206, 709/203, 204, 205; 345/752; 707/3, 2, 6, 707/10; 715/501.1, 526; 710/100
    See application file for complete search history.

(56) References Cited

U.S. PATENT DOCUMENTS

| | | | | |
|---|---|---|---|---|
| 5,787,416 A | * | 7/1998 | Tabb et al. | 707/2 |
| 5,815,830 A | * | 9/1998 | Anthony | 707/6 |
| 5,822,539 A | * | 10/1998 | van Hoff | 709/236 |
| 5,913,215 A | * | 6/1999 | Rubinstein et al. | 707/10 |
| 5,923,846 A | * | 7/1999 | Gage et al. | 709/213 |
| 5,924,072 A | * | 7/1999 | Havens | 705/1 |
| 5,941,944 A | | 8/1999 | Messerly | |
| 6,029,192 A | * | 2/2000 | Hill et al. | 709/206 |
| 6,128,635 A | * | 10/2000 | Ikeno | 715/532 |
| 6,141,666 A | * | 10/2000 | Tobin | 715/513 |
| 6,154,738 A | * | 11/2000 | Call | 707/4 |
| 6,226,655 B1 | * | 5/2001 | Borman et al. | 715/501.1 |
| 6,356,633 B1 | * | 3/2002 | Armstrong | 379/265.11 |
| 6,438,632 B1 | * | 8/2002 | Kikugawa | 710/100 |
| 6,571,234 B1 | * | 5/2003 | Knight et al. | 707/3 |
| 6,594,652 B1 | * | 7/2003 | Sunaga et al. | 707/2 |
| 6,594,673 B1 | * | 7/2003 | Smith et al. | 707/104.1 |
| 6,654,735 B1 | * | 11/2003 | Eichstaedt et al. | 707/3 |
| 6,804,675 B1 | * | 10/2004 | Knight et al. | 707/10 |

(Continued)

FOREIGN PATENT DOCUMENTS

EP    0778534    6/1997

(Continued)

OTHER PUBLICATIONS

European Patent Office—Examination Report—App No. 01 301 522.7—1527 dated Feb. 16, 2004.

(Continued)

*Primary Examiner*—Rupal Dharia
*Assistant Examiner*—Kristie D. Shingles
(74) *Attorney, Agent, or Firm*—SoCal IP Law Group LLP (57) ABSTRACT

Disclosed is an electronic bulletin board system, which communicates with a user computer via a network, and mediates information exchange therebetween by an electronic bulletin board function. The electronic bulletin board is accompanied with a database of a notable words collection storing a plurality of words that are appropriately selected, each word in which is linked with a corresponding URL. A message text from a user computer is checked by using the notable words collection. When the message text does not include a notable word in the notable words collection, the message is posted on the bulletin board. When a notable word is found in the text, the notable word in the message text is converted into a hypertext format having the URL to which the word is linked as a link destination, and the message is posted on the bulletin board.

8 Claims, 4 Drawing Sheets

U.S. PATENT DOCUMENTS 6,865,715 B1 * 3/2005 Uchino et al. .............. 715/526

FOREIGN PATENT DOCUMENTS

| EP | 0810534 | 12/1997 |
|---|---|---|
| EP | 0994621 | 4/2000 |
| JP | 59-94131 | 5/1984 |
| JP | 4-213258 | 8/1992 |
| JP | 5-227203 | 9/1993 |
| JP | 8-83286 | 3/1996 |
| JP | 9-294139 | 11/1997 |
| JP | 10-63592 | 3/1998 |
| JP | 10-133762 | 5/1998 |
| JP | 10-240649 | 9/1998 |
| JP | 10-275157 | 10/1998 |
| JP | 11-232192 | 8/1999 |
| WO | WO 99/49396 | 9/1999 |
| WO | WO 99/64965 | 12/1999 |

OTHER PUBLICATIONS

Australian Patent Office—Examination Report—App No. 18318/01 dated Feb. 20, 2004.
European Search Report dated May 16, 2003.
"UNIX User", vol. 6 No. 4, pp. 85-93; Publication Date Apr. 1, 1997.
Korean Patent Office—Examination Report—App No. 10-2001-0009480 dated Jul. 20, 2005.
Singapore Patent Office—Search Report—App No. 200100699-8.

* cited by examiner

ELECTRONIC BULLETIN BOARD SYSTEM AND MAIL SERVER

BACKGROUND OF THE INVENTION

1. Field of the Invention

The present invention relates to a server computer that is connected to the Internet, particularly to a server computer that functions as an electronic bulletin board and a mail server.

2. Related Art

Computers that are connected to the Internet contain user computers used by many unspecified users and server computers that provide various services to the user computers.

One of the server computers has an electronic bulletin board system and/or a mail server, which are for mediating information between the user computers. The electronic bulletin board system makes a message, which is contributed from a person who wants to post the message via the Internet, into a definite screen data, generally in a HTML format, and opens the screen data to public on the Internet.

The mail server receives an e-mail that a sender sent on the Internet according to a generally known SMTP procedure, and sends this e-mail to a mail address of a recipient of the e-mail. Then, the mail server sends the e-mail in an e-mail storage location, a mail box that corresponds to the mail address of the recipient to the user computer of a recipient who accessed to the mail server according to a POP procedure.

On the other hand, a hyperlink is known as a main system in the Internet. The hyperlink, hereinafter referred to as a link, links a text file, image data and voice data in sentences. A document created by using the link is a hypertext.

For example, when a hypertext document is being read on a user computer, a user performs a proper instruction operation, typically a click operation of a mouse for a character or a picture for which a link is set in the document. The instructed character or picture is linked with URL (Uniform Resource Locator), and the user computer obtains a specified document in a specified location on the Internet or activates a program in a specified location according to the URL. Of course, this link can be set in a text that includes a main message text and a main e-mail text posted on the electronic bulletin board.

When a document of the message or the e-mail is transformed into the hypertext, a creator of the document selects a text portion which the creator wishes to set the link, and performs operation of linking the text portion with a URL as a link destination. However, the hyperlink never be set unless the document creator intends to. Therefore, when a document reader wants to deepen understanding of the text included in the document, or to obtain related information, the reader has no option but to search such information by using a search engine that is open to public on the Internet and so on.

Moreover, even if the link is set, there is a case where a Web page of the link destination is already closed or the URL is changed. In order to cope with such cases, the document creator must check whether a setting of a link destination is effective or not as occasion demands. The link destination setting needs to be changed when a change to the link has been made.

SUMMARY OF THE INVENTION

One object of the present invention is to provide a totally new server computer, which automatically sets a URL for obtaining related information with regard to a word included in a message or a text of an e-mail posted on the electronic bulletin board, and transforms the URL into a hypertext. The new server computer opens a bulletin board including a message of the hypertext format to public, and sends the e-mail with a link set thereto to an e-mail address of the recipient.

According to one aspect of the present invention, an electronic bulletin board system including a server computer with an electronic bulletin board function communicating with at least one user computer via a network for mediating information exchange therebetween is provided. The server computer comprises:

a database as a notable words collection storing a plurality of words that are appropriately selected, each of the notable words in the database being linked with a corresponding URL;

a logic device inspecting a message text sent from a user computer of a person who wants to post a message by consulting the notable words collection, wherein the inspected message text is posted on the bulletin board when the message text does not include a notable word in the notable words collection; and the notable word in the message text is converted into a hypertext format having a URL to which the word is linked as a link destination, and the message text is posted on the bulletin board when the message text includes a notable word in the notable words collection.

According to another aspect of the present invention, an electronic bulletin board system including a server computer is provided. The server computer comprises:

a first database as a notable words collection storing a plurality of words that are appropriately selected;

a second database storing a plurality of records with text data;

a logic device inspecting a message text sent from a user computer of a person who wants to post a message by consulting the notable words collection, wherein the message text is posted on the bulletin board when the message text does not include a notable word in the notable words collection;

the second database is searched by using the notable word as a keyword when the message text includes a notable word in the notable words collection, and if the record including the notable word does not exist in the database, the message text is posted on the bulletin board; and when the record including the notable word exists as a result of searching the second database, the word in the message text is converted into a hypertext format having a URL generated properly to which the word is linked as a link destination, and the message text is posted on the bulletin board, the URL being so described as to constitute a start instruction to a search report program, which reports a result of searching the first database by using the notable word as a keyword, and when the URL is sent from a specific user computer, the search report program is executed to return a set of report screen data of the search result to the specific user computer.

According to yet another aspect of the present invention, a mail server receiving an e-mail sent from a user computer via a network and sending the e-mail to the network directed to an e-mail address of a recipient of the e-mail is provided. The mail server comprises:

a database as a notable words collection storing a plurality of words that are appropriately selected, each of the notable words in the database being linked with a corresponding URL;

a logic device inspecting a message text in an e-mail sent from a user computer by consulting the notable words collection, wherein the e-mail is sent to the e-mail address of a recipient when the message text does not include a notable word in the notable words collection; and the notable word in the message text is converted into a hypertext format having a URL to which the notable word is linked as a link destination, and the e-mail directing to the e-mail address of the recipient is sent when the message text includes a notable word in the notable words collection.

According to further aspect of the present invention, a mail server comprises:

a first database as a notable words collection storing a plurality of words that are appropriately selected;

a second database storing a plurality of records, each of the records including text data;

a logic device inspecting a message text in an e-mail sent from a user computer by consulting the notable words collection, wherein the e-mail is sent to the e-mail address of the recipient when the message text does not include a notable word in the notable words collection;

the second database is searched by using the notable word as a keyword when the message text includes a notable word in the notable words collection, and if the record including the notable word does not exist in the database, sending the e-mail to the recipient; and when the record including the notable word exists as a result of searching the second database, the notable word in the message text is converted into a hypertext format having a URL generated properly to which the notable word is linked as a link destination, and the e-mail is sent to the recipient, the URL being so described as to constitute a start instruction to a search report program, which reports a result of searching the first database by using the notable word as a keyword, and when the URL is sent from a specific user computer, the search report program is executed to send a set of report screen data of the search result to the specific user computer.

According to yet another aspect of the present invention, a method of operating an electronic bulletin board system including a server computer with an electronic bulletin board function communicating with at least one user computer via a network for mediating information exchange therebetween, comprises:

inspecting a message text sent from a user computer of a person who wants to post a message by consulting a database as a notable words collection storing a plurality of words that are appropriately selected, each of the notable words in the database being linked with a corresponding URL;

posting the inspected message text on the bulletin board when the message text does not include a notable word in the notable words collection; and converting the notable word in the message text into a hypertext format having a URL to which the word is linked as a link destination, and posting the message text on the bulletin board when the message text includes a notable word in the notable words collection.

According to further aspect of the invention, a method of operating an electronic bulletin board system including a server computer with an electronic bulletin board function communicating with at least one user computer via a network for mediating information exchange therebetween, comprises:

inspecting a message text sent from a user computer of a person who wants to post a message by consulting a first database as a notable words collection storing a plurality of words that are appropriately selected;

posting the message text on the bulletin board when the message text does not include a notable word in the notable words collection;

searching a second database by using the notable word as a keyword when the message text includes a notable word in the notable words collection, and posting the message text on the bulletin board if the record including the notable word does not exist in the second database, the second database storing a plurality of records including text data; and when the record including the notable word exists as a result of searching the text database, the notable word in the message text is converted into a hypertext format having a URL generated properly to which the word is linked as a link destination, and the message text is posted on the bulletin board, the URL being so described as to constitute a start instruction to a search report program, which reports a result of searching the second database by using the notable word as a keyword, and when the URL is sent from a specific user computer, the search report program is executed to return a set of report screen data of the search result to the specific user computer.

According to yet another aspect of the present invention, a method of operating a mail server for receiving an e-mail sent from a user computer via a network and sending the e-mail to the network directed to an e-mail address of a recipient of the e-mail, comprises:

inspecting a message text in an e-mail sent from a user computer by consulting a database as a notable words collection storing a plurality of words that are appropriately selected, each of the notable words in the database being linked with a corresponding URL;

sending the e-mail to the e-mail address of a recipient when the message text does not include a notable word in the notable words collection; and when the text includes a notable word in the notable words collection, converting the notable word in the message text into a hypertext format having a URL to which the notable word is linked as a link destination, and sending the e-mail directing to the e-mail address of the recipient.

According to further aspect of the invention, a method of operating a mail server for receiving an e-mail sent from a user computer via a network and sending the e-mail to the network directed to an e-mail address of a recipient of the e-mail, comprises:

inspecting a message text in an e-mail sent from a user computer by consulting a first database as a notable words collection storing a plurality of words that are appropriately selected;

sending the e-mail to the e-mail address of the recipient when the text does not include a notable word in the notable words collection;

searching a second database storing a plurality of records, each of which including text data, by using the notable word as a keyword when the message text includes a notable word in the notable words collection, and if the record including the notable word does not exist in the database, sending the e-mail to the recipient; and when the record including the notable word exists as a result of searching the second database, converting the notable word in the message text into a hypertext format having a URL generated properly to which the notable word is linked as a link destination, and sending the e-mail to the recipient, the URL being so described as to constitute a start instruction to a search report program, which reports a result of searching the text database by using the notable word as a keyword, and when the URL is sent from a specific user computer, executing the search report program to send a set of report screen data of the search result to the specific user computer.

Each of the records stored in the second database may be linked with a corresponding URL, and the search report program may generate a set of screen data including a hypertext having the URL to which the obtained record is linked as a link destination.

BRIEF DESCRIPTION OF THE DRAWINGS

For more complete understanding of the present invention and the advantages thereof, reference is now made to the following description taken in conjunction with the accompanying drawings, in which.

DETAILED DESCRIPTION OF THE PREFERRED EMBODIMENTS

<<Network Constitution>>

Figure 1:
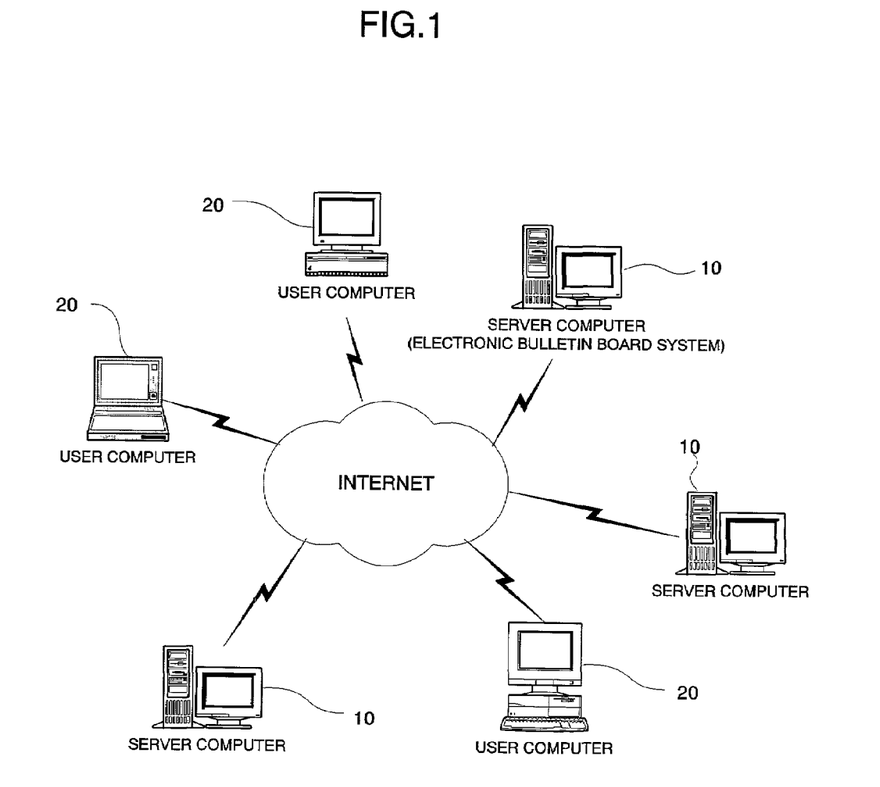
FIG. 1 is a network constitution view including the embodiment of the electronic bulletin board of the present invention.

The Internet is exemplified as a network that includes embodiments of the electronic bulletin board system of the present invention. FIG. 1 shows a network constitution in the case of the Internet as a schematic view. A plurality of server computers 10 represented by WWW servers and mail servers and user computers 20 such as personal computers used by many unspecified users are organically combined.

The electronic bulletin board system of the present invention, one of the server computers 10, is accompanied with various databases, and functions as a regular WWW server that sends appropriate data such as screen data of a Web page to a user computer that accessed by specifying a URL. Then, the bulletin board is a description in which a message contributed from the user computer is refined in a specified format, and is provided as one of Web pages. In addition, the electronic bulletin board system performs operation for activating a specified program according to a specified URL. The system updates database while obtaining and processing various data via data communication with the user computers.

<<Basic Function of the Electronic Bulletin Board>>

The electronic bulletin board posts a message contributed from a user computer on the bulletin board generally according to the following procedures (i) to (iii).

(i) The bulletin board system sends a definite screen data, e.g., a form that includes each blank for such as a contributor of the message, a title and a text of the message to the user computer that accessed to the system by specifying a URL.

(ii) The system receives the form in which required items are filled in each blank from the user computer.

(iii) The system obtains a written information for each blank of the filled form, and posts the message on a Web page equivalent to an electric bulletin board in an appropriate format.

According to the electronic bulletin board system of the present invention, in executing the procedure of (iii), when a word in the message text satisfies a specified condition, the system has a function to set an appropriate URL as a link destination of the word and to transform the message text into a hypertext format. In the following, this automatic link setting function will be described.

<<Definition of Words>>

In order to facilitate description of the automatic link setting function of the embodiment, the following words are defined.

<Notable Words Collection>

Notable words collection is a database storing a plurality of words that are appropriately selected by an operator of the electronic bulletin board system.

<Notable Word>

Notable word is a word or character array which exists in the notable word collection of the bulletin board system or in a message text which is referred to the notable word collection.

<Keyword>

Keyword is a parameter of a text form that is given to a program to be executed in the electronic bulletin board system.

<Record>

Record is data that defines linkage between text data, in which meaningful sentences are described, and a URL. At least one database storing the record exists.

<Search Report Program>

Search report program searches the record in a database by using a specified word as a keyword, and performs procedures for making screen data, on which text data included in a searched record and a URL are formed into a table. In the embodiment, the search report program is a program prepared as CGI (Common Gateway Interface) by the electronic bulletin board, which is activated by specifying a specified URL.

<<Automatic Link Setting>>

Figure 2:
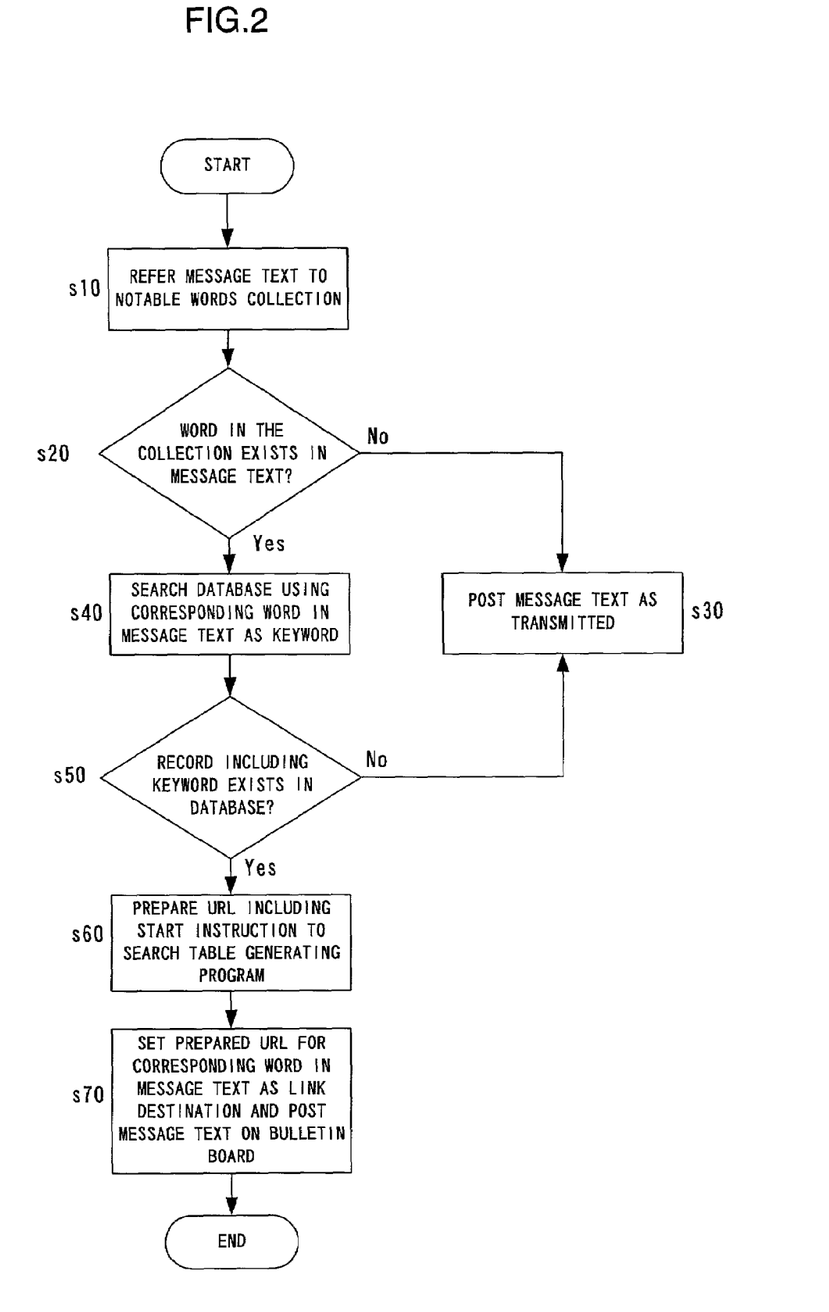
FIG. 2 is a flow chart of an automatic link setting processing executed by the embodiment.

The electronic bulletin board system operates the above described various databases in order to realize the automatic link setting function. FIG. 2 shows a flow of the automatic link setting operation in the electronic bulletin board system. When a message is contributed, the electronic bulletin board system refers the obtained message text to the notable words collection (s10). In other words, the system checks whether a character array that matches a word in the notable words collection exists in the text or not (s20). If a notable word in the notable words collection does not exist in the message text, the message is posted as it is on the bulletin board (s30).

On the other hand, suppose that a notable word in the notable words collection exists in the message text. In this case, a database search is performed by using the notable word as a keyword (s40). If a record including the word does not exist in the database, the message text is posted as it is (s50 to s30). When a record including the notable word exists in the database, the system makes a URL that includes an order to activate the search report program by using the notable word in the message text as a keyword (s50 to s60). Then, by setting the URL on the corresponding word in the message text as a link destination, this message text is transformed into a document of the hypertext format (s70). Incidentally, in the embodiment, the upper limit of the number of records included in one screen is set as a parameter in the URL according to the case where a number of records are searched by the search report program.

<<Activation of the Search Report Program>>

Figure 3:
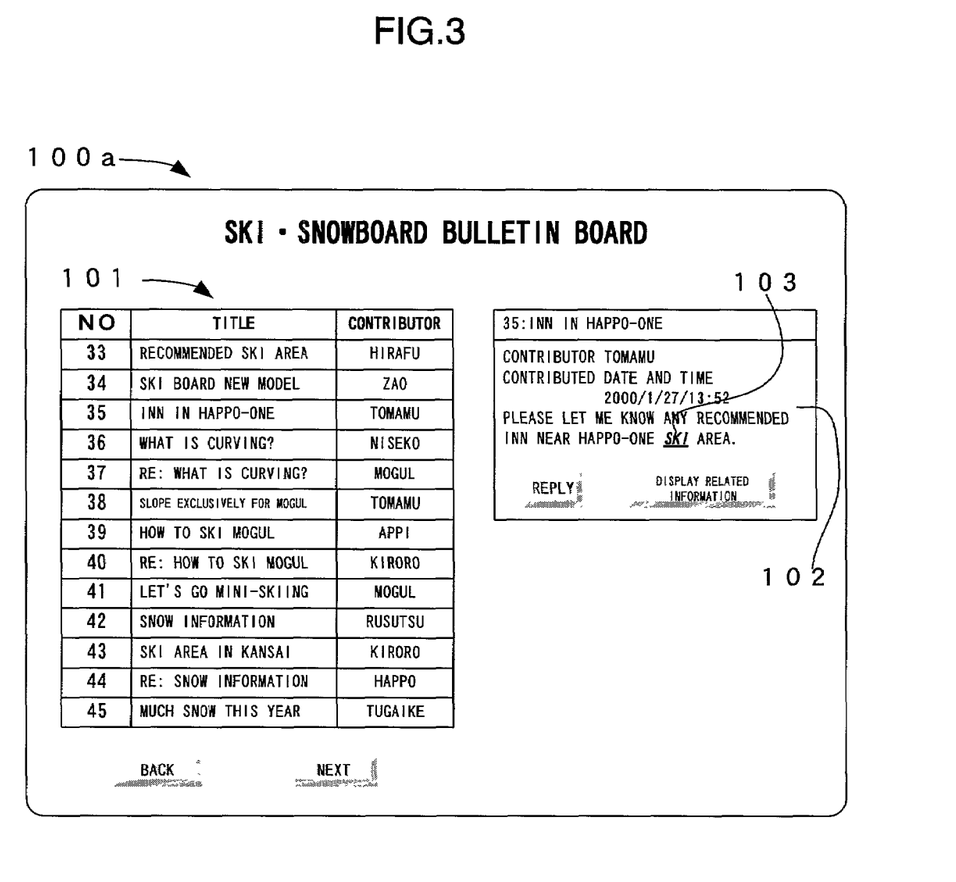
FIG. 3 is a schematic view of a Web page equivalent to the bulletin board that is provided in the embodiment.

Suppose that a user reads a bulletin board provided by the electronic bulletin board system by a user computer, hereinafter referred to as a "user computer A." FIG. 3 shows an example of a display screen of the bulletin board as a schematic view. On the left part of the screen 100a, a table 101 including titles of messages, contributors and the like is displayed. Upon specifying any of item names by the user computer A, a message text 102 along with its title, item name, and contributed date are to be displayed on the right part of the screen. In the message text 102, with regard to a word (word that exists in the notable words collection and the database) that satisfies the above-described condition, a URL including a description to activate the search report program by using the notable word as a keyword is set as a link destination. Moreover, as for characters regarding the notable word to which the link is set, their color is changed or they are underlined, so that one can know that the link is set to the part of the characters. In FIG. 3, a word "ski" (103) in the message text is the notable word, to which the link is set.

Figure 4:
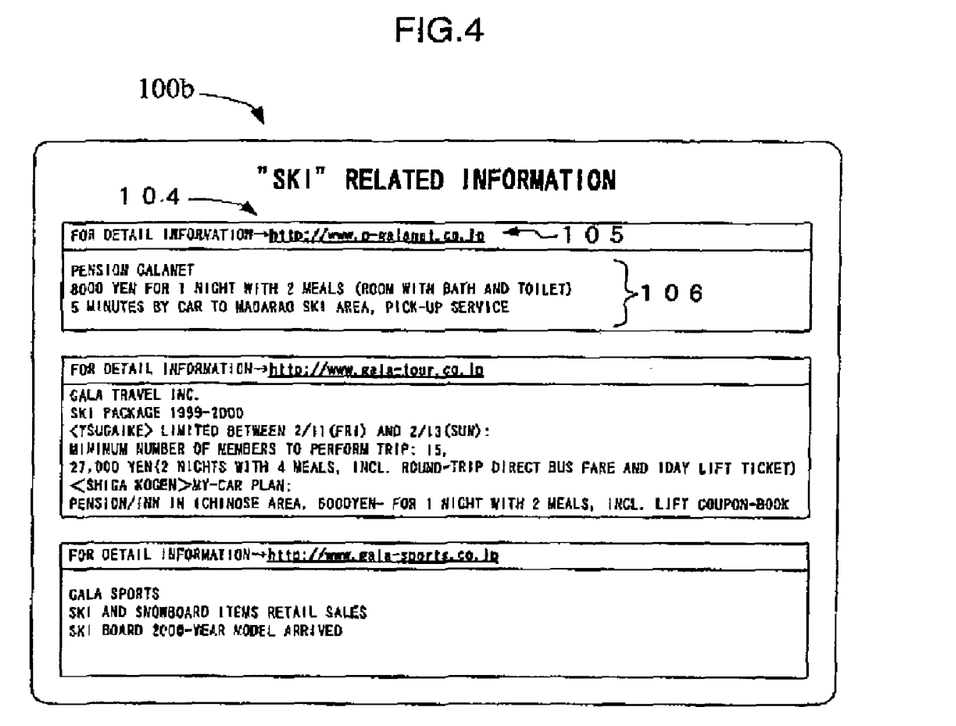
FIG. 4 is a schematic view of a search table screen that is made in the embodiment.

Suppose that the character array "ski" is designated by an operation such as a mouse click and the like by the user computer A. The electronic bulletin board system according to a URL specified by the designation gives the search report program the notable word "ski" as a keyword. Then, the search report program picks up records including "ski" from the database, transforms the records into screen data for displaying the URL and the text included in each records as a table, and returns the screen data to the user computer A. FIG. 4 schematically shows an example of a table on the screen according to the returned screen data. On the screen 100b, a URL 105 and a text 106 are divided by a frame for every record 104 into table displays.

APPLIED EXAMPLES AND OTHER EXAMPLES

Applied Example

As an applied example of the electronic bulletin board system of the invention, the bulletin board may be utilized as an advertising medium. For example, an operator of the electronic bulletin board system collects advertisement posting charges, and stores text data of advertisement sentences, which are consigned to post by a advertiser, and a URL for obtaining a homepage, which posts the advertisement sentences and information of the advertiser. Accordingly, a reader of the bulletin board can read an advertisement sentences related to a word in which the reader is interested, and also can know related information to the advertisement. Thereby, the bulletin board provided by the electronic bulletin board system can function as the advertisement medium.

Modified Example

Each record does not need to include a URL as the above-described embodiment. Instead, screen data made by a search table making program may post texts with searched records in a table. Of course, records with URLs and without URLs may be mixed.

In addition, a URL may directly be linked with each word included in the notable words collection. A homepage directly related to a notable word that is included in a message text thereby may be read by a user. When a plurality of URLs are linked with each word in the notable words collection, the URLs may be presented in a table.

<Other Embodiments: Mail Server>

Some e-mail transmitting/receiving software can transmit/receive e-mail of a HTML format. Therefore, such software can specify the text portion to activate a browser for specifying a URL of a link destination as well as setting the link with a word included in an e-mail text and receiving an e-mail including a word to which the link is set. The present invention is designed to provide a mail server comprising the above-described automatic link setting function.

In the mail server comprising the automatic link setting function, the basic operation is similar to a conventional mail server. However, when an e-mail directed to the e-mail address of the recipient is sent from a user computer, the mail server refers the e-mail text to the notable words collection. When the referred e-mail text has a notable word that satisfies a similar condition as the above-described electronic bulletin board system, an appropriate URL for the notable word is set as a link destination. And the mail server sends the e-mail, to which the link destination is set, to the Internet directing to the e-mail address of the recipient.

According to the present invention, a link destination is automatically set for obtaining related information to each word included in a message and e-mail text that are posted on the electronic bulletin board. Therefore, there is no need for a contributor or a sender to set a link for every word. Moreover, a message and a reader have more opportunity to obtain related information comparing to the case where the contributor and the sender set the link destination on purpose.

Further, since a URL that is set to a word of a message text or an e-mail text as a link destination includes a start instruction to the search report program, search processing is executed when a reader of the message and the e-mail specifies a URL set in the word. As a result, the reader can obtain the latest information even if the content of the database is updated.

Although the preferred embodiments of the present invention have been described in detail, it should be understood that various changes, substitutions and alternations can be made therein without departing from spirit and scope of the inventions as defined by the appended claims.

What is claimed is:

1. An electronic bulletin board system including a server computer with an electronic bulletin board function communicating with at least one user computer via a network for mediating information exchange therebetween, said server computer comprising:
   a first database as a notable words collection storing a plurality of words that are appropriately selected;
   a second database storing a plurality of records with text data;
   a logic device inspecting a message text sent from a user computer of a person who wants to post a message by consulting the notable words collection, wherein
   the message text is posted on the bulletin board when the message text does not include a notable word in the notable words collection;
   the second database is searched by using the notable word as a keyword when the message text includes a notable word in the notable words collection, and if no records including the notable word exist in the second database, then the message text is posted on the bulletin board; and
   when a record including the notable word exists as a result of searching the second database, the word in the message text is converted into a hypertext format having a URL generated properly to which the word is linked as a link destination, and the message text is posted on the bulletin board, the URL being so described as to constitute a start instruction to a search report program, which reports a result of searching the second database by using the notable word as a keyword, and when the URL is sent from a specific user computer, the search report program is executed to return a set of report screen data of the search result to the specific user computer.

2. An electronic bulletin board system according to claim 1, wherein each record stored in the second database is linked with a corresponding URL, and the search report program generates a set of screen data including a hypertext having the URL to which the obtained record is linked as a link destination.

3. A mail server receiving an e-mail sent from a user computer via a network and sending the e-mail to the network directed to an e-mail address of a recipient of the e-mail, said mail server comprising:

a first database as a notable words collection storing a plurality of words that are appropriately selected;

a second database storing a plurality of records, each of the records including text data;

a logic device inspecting a message text in an e-mail sent from a user computer by consulting the notable words collection, wherein the e-mail is sent to the e-mail address of the recipient when the message text does not include a notable word in the notable words collection;

the second database is searched by using the notable word as a keyword when the message text includes a notable word in the notable words collection, and if no records including the notable word exist in the second database, then sending the e-mail to the recipient; and when a record including the notable word exists as a result of searching the second database, the notable word in the message text is converted into a hypertext format having a URL generated properly to which the notable word is linked as a link destination, and the e-mail is sent to the recipient, the URL being so described as to constitute a start instruction to a search report program, which reports a result of searching the second database by using the notable word as a keyword, and when the URL is sent from a specific user computer, the search report program is executed to send a set of report screen data of the search result to the specific user computer.

4. A mail server according to claim 3, wherein each of the records stored in the second database is linked with a corresponding URL, and the search report program generates a set of screen data including a hypertext having the URL to which the obtained record is linked as a link destination.

5. A method of operating an electronic bulletin board system including a server computer with an electronic bulletin board function communicating with at least one user computer via a network for mediating information exchange therebetween, comprising:

inspecting a message text sent from a user computer of a person who wants to post a message by consulting a first database as a notable words collection storing a plurality of words that are appropriately selected;

posting the message text on the bulletin board when the message text does not include a notable word in the notable words collection;

searching a second database by using the notable word as a keyword when the message text includes a notable word in the notable words collection, and posting the message text on the bulletin board if no records including the notable word exist in the second database, the second database storing a plurality of records including text data; and when a record including the notable word exists as a result of searching the text database, the notable word in the message text is converted into a hypertext format having a URL generated properly to which the word is linked as a link destination, and the message text is posted on the bulletin board, the URL being so described as to constitute a start instruction to a search report program, which reports a result of searching the second database by using the notable word as a keyword, and when the URL is sent from a specific user computer, the search report program is executed to return a set of report screen data of the search result to the specific user computer.

6. A method of operating an electronic bulletin board system according to claim 5, wherein each record stored in the second database is linked with a corresponding URL, and the search report program generates a set of screen data including a hypertext having the URL to which the obtained record is linked as a link destination.

7. A method of operating a mail server for receiving an e-mail sent from a user computer via a network and sending the e-mail to the network directed to an e-mail address of a recipient of the e-mail, comprising:

inspecting a message text in an e-mail sent from a user computer by consulting a first database as a notable words collection storing a plurality of words that are appropriately selected;

sending the e-mail to the e-mail address of the recipient when the text does not include a notable word in the notable words collection;

searching a second database storing a plurality of records, each of which including text data, by using the notable word as a keyword when the message text includes a notable word in the notable words collection, and if no records including the notable word exist in the second database, then sending the email to the recipient; and when a record including the notable word exists as a result of searching the second database, converting the notable word in the message text into a hypertext format having a URL generated properly to which the notable word is linked as a link destination, and sending the e-mail to the recipient, the URL being so described as to constitute a start instruction to a search report program, which reports a result of searching the second database by using the notable word as a keyword, and when the URL is sent from a specific user computer, executing the search report program to send a set of report screen data of the search result to the specific user computer.

8. A method of operating a mail server according to claim 7, wherein each of the records stored in the second database is linked with a corresponding URL, and the search report program generates a set of screen data including a hypertext having the URL to which the obtained record is linked as a link destination.

* * * * *